United States Patent Office 3,322,577
Patented May 30, 1967

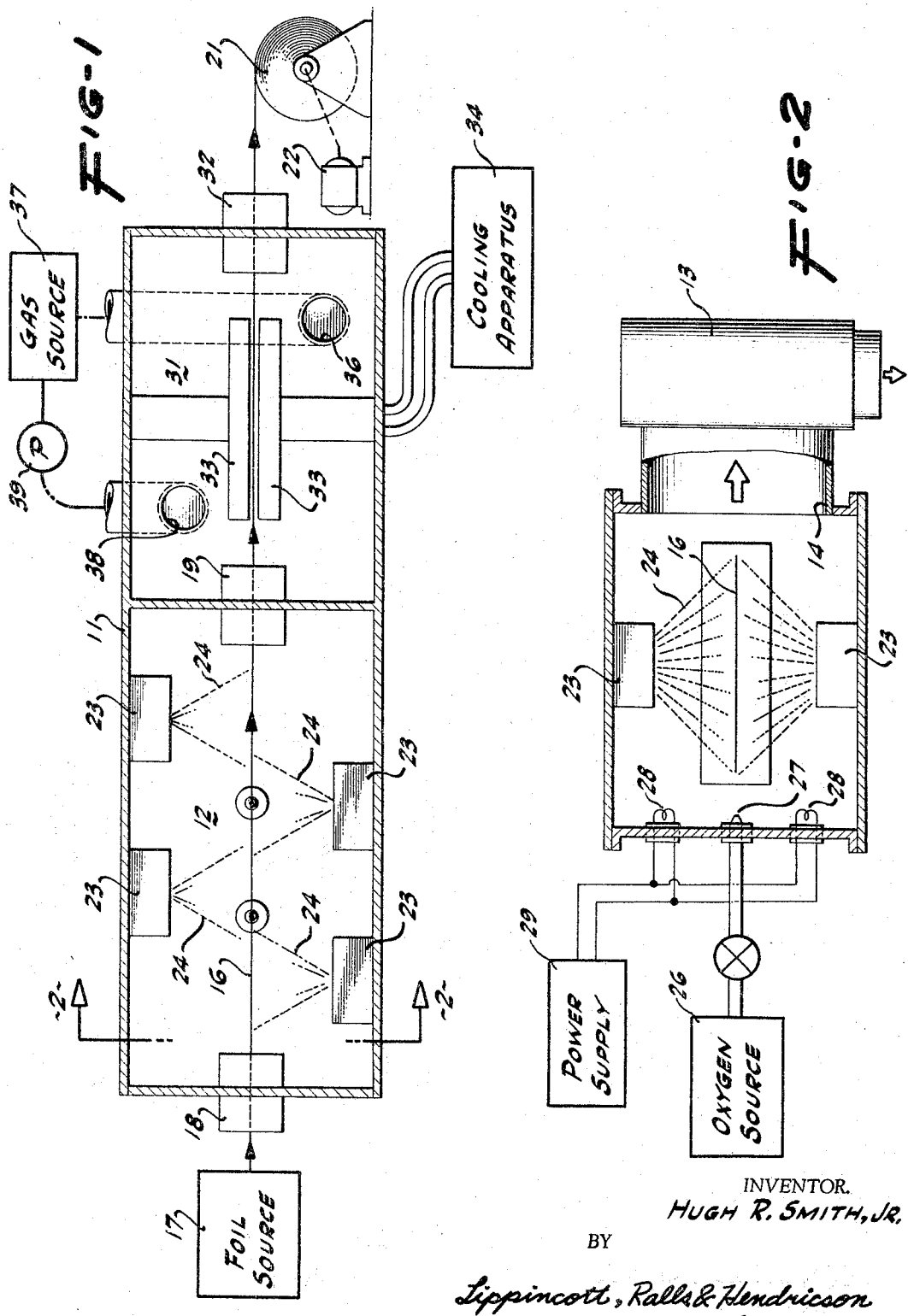

3,322,577
METHOD AND APPARATUS FOR THE CONTINUOUS PRODUCTION OF OXIDE COATINGS
Hugh R. Smith, Jr., Piedmont, Calif., assignor to Temescal Metallurgical Corporation, Berkeley, Calif., a corporation of California
Filed May 3, 1963, Ser. No. 277,841
9 Claims. (Cl. 148—6.3)

The present invention relates to a new and novel method and apparatus for forming oxide coatings and is particularly adapted to the continuous production of oxide films upon metal foils. For example, the invention is advantageous in the oxide coating of tantalum or aluminum foils for use in foil-type capacitors.

The protective and insulative properties of oxide film are widely known and in addition the oxides of certain metals possess good dielectric qualities. The following description is referenced to the production of oxide films upon foils suitable for utilization in capacitors. Certain prior art work relates to the use of oxide films as dielectrics; however, the present invention materially differs therefrom, as explained in some detail below. In the expanding field of electronics, the necessity of smaller packaging requires the use of minute capacitors with low leakage properties, particularly in high-frequency transistor circuits. Typical examples of these requirements are to be found in servo control circuitry, energy storage circuits, phase shift servo systems, magnetic amplifiers, and memory systems. The foregoing applications require capacitors having large capacitive values and low leakage properties. One of the more desirable materials employed in the production of capacitors is tantalum. Tantalum oxide capacitors are known to operate over a very wide temperature range (−60° to +200° C.), as compared to a nominal temperature range of about −20° to +80° C. available from standard capacitors. Tantalum oxide capacitors are recognized to possess large capacitive values with low leakage currents and to have a relatively long stable shelf life. The present invention is highly advantageous in the production of material for tantalum capacitors.

The conventional process for producing foil type capacitors is known as "forming" and consists of interleaving tantalum foil with insulating spacers and then winding this sandwich together. The foil and spacers are then immersed in an aqueous solution of a suitable salt, as an electrolyte, so that upon heating and applying a DC voltage there is formed an oxide layer on the foil. It is also known to be possible to increase the thickness of the oxide film by fused sale electrolysis at somewhat higher temperatures than is employed in the above example.

One serious difficulty encountered in the conventional process of making oxide-coated films by electrolysis is that the thickness of the coating depends upon the applied forming voltage, the reaction temperature and the electrolytic concentration. It is thus necessary to carefully control the concentration of the electrolyte and to continuously replenish the electrolyte. In addition, electrolysis results in the formation of unnecessary and undesirable by-products which must be prevented from affecting the coated foil. Electrolytic processing necessitates the utilization of high voltages for high-speed reactions and results in substantial energy loss through the resistance of the electrolyte. Insofar as rapid production is concerned, conventional processing requires repeated dippings of the foil and is normally only carried out as batch processing so that economically feasible production rates are difficult to achieve.

An object of this invention is to provide improved method and apparatus for oxide coating wherein the foregoing limitations of electrolytic processing are precluded.

Another object of this invention is to provide method and apparatus for continuously forming oxide coatings only upon those elements being processed without affecting the elements of the system.

Another object of this invention is to provide a method of producing oxide-coated metal foil in a single continuous process.

Various other possible objects and advantages of the present invention will become apparent to those skilled in the art from the following description taken in connection with the accompanying drawing, wherein:

FIGURE 1 is a schematic sectional view longitudinally through a preferred embodiment of the apparatus of this invention and suitable for carrying out the method of this invention; and FIGURE 2 is a transverse sectional view taken in plane 2—2 of FIGURE 1.

According to the present invention, a relatively pure oxygen atmosphere is provided by evacuating a vacuum chamber or region to extremely low pressure to attain a very high vacuum. This evacuation is continued at a high rate and oxygen is fed through the vacuum region to purge the region of residual gases such as nitrogen and carbon dioxide, which would otherwise react with the metal to be coated. After purging, oxygen is continually bled into the vacuum chamber while maintaining evacuation so that a low pressure oxygen atmosphere is attained. Material to be coated is then continuously moved through the vacuum chamber and is heated therein to reaction temperature for forming a desired oxide coating thereon.

In addition to the foregoing, the present invention further provides for the ionization of oxygen molecules within the vacuum region. This is particularly advantageous under the circumstances wherein the metal to be coated is maintained at a negative potential. Such a negative potential normally occurs from electron bombardment heating, which may be employed herein.

In the illustrated example of the present invention a continuous foil of metal to be oxide coated is passed through a chamber containing a pure oxygen atmosphere at reduced pressure. The chamber is evacuated and the evacuation is continued at an elevated rate throughout processing. Oxygen gas is fed relatively slowly into the evacuated chamber and the foil is continuously passed through the chamber with appropriate vacuum seals at inlet and outlet for maintaining the desired vacuum conditions. Within the chamber the foil is heated as by electron bombardment to reaction temperature for forming a desired integral oxide coating upon the metal passed through the chamber.

Considering now suitable apparatus for carrying out the above-described method and referring to the drawings, there is shown a housing 11 defining a vacuum chamber 12 which comprises the reaction zone for the processing hereof. This chamber 12 is continuously evacuated by pumping means 13 communicating with the chamber through large ports 14. A plurality of high-speed vacuum pumps may be arranged in communication with the vacuum chamber 12 and assisted by suitable backing pumps to evacuate the chamber to a pressure in the order of $10^{-6}$ millimeters of mercury.

Provision is made for the passage through the vacuum chamber 12 of metal to be oxide coated and in the illustrated embodiment a foil 16 is illustrated as the material operated upon. This foil is provided from a foil source 17 such as that described, for example, in Patent No. 3,181,209, or other suitable source. Vacuum sealing means 18 in a wall of the housing 11 provides for passage of the foil into the chamber 12 without loss of vacuum in the chamber. The foil extends through the chamber, as illustrated, and through a second vacuum sealing means 19 at the outlet of the chamber. The foil 16 is drawn through the chamber and wound upon a reel 21 which may be driven by a motor 22 in order to afford foil transport.

Within the chamber 12 there are provided a plurality of electron beam generators 23, hereinafter denominated as electron guns, operable to generate and propagate high-energy electron beams 24. A variety of different electron generating structures may be employed to produce electron beams in the present invention and reference is made to the literature for details of suitable electron guns. Heating of the foil 16 is accomplished by electron bombardment and the electron guns may be oriented to bombard both upper and lower surfaces of the foil if desired. However, with thin foils it is normally only necessary to bombard one side thereof in order to attain an adequate temperature of the entire foil. In the oxide coating of more bulky objects, the electron guns are particularly disposed to insure adequate heating of the entire surface of objects to be coated through bombardment of the entire surfaces thereof.

Within the reaction zone defined by the vacuum chamber 12 there is established a low-pressure atmosphere of oxygen and to this end an oxygen source 26 is provided in connection with small nozzles 27 within the vacuum chamber. A relatively low rate of oxygen flow is provided from the source through the nozzles 27 into the chamber and with the continuous evacuation of the chamber a steady flow of low pressure oxygen through the chamber is attained. In the instance of electron beam heating of the foil or other material to be coated, it will be understood that this foil, or the like, becomes negatively charged. Under these circumstances, it is advantageous to ionize the molecules of oxygen within the chamber in order that they shall be attracted to the surface of the foil. This ionization is illustrated to be accomplished by the provision of high voltage probes 28 disposed within the chamber 12 and energized from an external power supply 29.

As a further portion of the present invention, there may be provided method and means for cooling of the oxide-coated material leaving the vacuum chamber 12. It is advantageous that this cooling be accomplished relatively rapidly in order to fix the depth of oxide coating, as it is known that oxygen penetration into metal continues with time at elevated temperatures. Although an equilibrium condition will eventually result, it is oftentimes desirable to limit this oxygen penetration, for it is known that metal oxides normally have a high electrical resistance. Thus, in the instance wherein a thin metal foil is to be oxide-coated in order to provide for enhancing electrical resistance or dielectric properties at the surface thereof and yet to maintain a high conductivity through the foil, it is necessary to carefully control and limit the depth of oxygen penetration.

There is illustrated in FIGURE 1 of the drawing means for cooling an oxide coated foil, for example. As shown, these means include a separate chamber 31 also defined by the housing 11 and sealed from the atmosphere. The foil 16 passes through this chamber 31 and through a vacuum seal 32 from the chamber onto the take-up reel 21. Within the cooling chamber 31 there may be provided chill plates 33 disposed in close proximity to the travelling foil on opposite sides thereof and maintained at a relatively low temperature by external cooling apparatus 34 circulating cooling fluid through the plates. Additionally, provision is made for the circulation of an inert gas through the cooling chamber 31. An inlet port 36 is connected to a gas source 37 and an outlet port 38 is connected to a pump 39 that may, in turn, feed back to the source 37. Argon, or the like, is circulated through the cooling chamber 31 by the pump 39 and this inert gas may be directed onto the travelling foil for increased cooling if desired.

In the preferred embodiment of the present invention illustrated in the drawings, a foil is shown to be passed through the apparatus; however, other types of objects to be coated may also be passed therethrough. Thus the foil 16 may, under alternative circumstances, comprise a carrier or transport means such as an endless belt, or the like, suitably driven to pass objects thereon through the vacuum chamber 12 and cooling chamber 31. By the direct utilization of oxygen gas in a high vacuum at reaction temperatures, the present invention overcomes substantially all of the prior art problems involved in oxidation by electrolysis. An extremely simple and straightforward processing is attained hereby with the particular advantage of continuous processing. Not only does the present invention provide for a maximization of throughput, but furthermore provides for rapid and accurate control. Inasmuch as heating is accomplished in a vacuum, preferably by electron bombardment, it is possible, in accordance herewith, to very accurately control the temperature of the material being oxidized. This latter feature is extremely important in many instances, and particularly in the foregoing example of the production of oxide coated foil for capacitors. It is again noted in this respect that it is necessary to achieve very accurate control over the depth of oxidation in the coating of foils to be employed in capacitors, for otherwise the electrical properties of the foil itself will be deleteriously affected. Too deep a penetration of oxygen results in a material impairment of the current-carrying capabilities of the foil. The difficulties involved in this careful control are exemplified by noting that the foil may, for example, have the thickness of a few mils. Consequently, it is necessary and possible, in accordance with the present invention, to control the thickness of oxide coating within fractions of mils.

The method and apparatus of the present invention have been described above in terms of particular preferred steps of the method and certain preferred structure of one embodiment of the apparatus. It is not intended to limit the present invention by the terms of this description, but instead reference is made to the appended claims for a precise delineation of the true scope of this invention.

What I claim is:
1. A continuous process for oxidizing surfaces of metal comprising:
 (a) highly evacuating a region;
 (b) continuously passing metal to be oxidized through the evacuated region while maintaining the vacuum therein;
 (c) raising the surface of temperature of metal within the evacuated region by electron bombardment heating of the metal therein;
 (d) establishing a low pressure oxygen atmosphere adjacent the surface of metal in the evacuated region; and
 (e) cooling the metal.

2. A process as set forth in claim 1 further defined by ionizing the oxygen for attracting oxygen molecules to the surface of the metal to improve oxidation of the surface.

3. An improved process for oxide coating metal comprising:
 (a) purging a reaction volume with oxygen to establish a substantially pure oxygen atmosphere,
 (b) continuously evacuating the reaction volume to high vacuum and bleeding oxygen therethrough while maintaining the vacuum,
 (c) rapidly passing metal to be coated through said reaction volume while sealing entrance and egress of the metal to preserve the high vacuum in this region;
 (d) heating the metal in the reaction volume with an electron beam to reaction temperature for producing an oxide coating upon the surface of the metal; and
 (e) cooling the oxide coated metal in an inert atmosphere.

4. An improved process as set forth in claim 3 further defined by maintaining a pressure of the order of $10^{-4}$ to $10^{-5}$ millimeters of mercury in the reaction volume during oxidation of the metal.

5. An improved process as set forth in claim 3 further defined by ionizing the oxygen bled through the reaction volume for attracting oxygen molecules to the metal and hastening oxidation.

6. Apparatus for oxide coating of material comprising:
   (a) a housing defining a vacuum chamber,
   (b) vacuum pumping means communicating with said chamber and continuously evacuating the chamber to a high vacuum,
   (c) supply means directing a flow of oxygen gas into said chamber for maintaining a continuously replenished low pressure oxygen atmosphere therein;
   (d) vacuum sealing means in said housing for entry and egress of material to said chamber while maintaining the chamber vacuum tight;
   (e) and at least one electron source directing electrons onto material within the chamber for raising the surface temperature thereof to reaction temperature for oxidation whereby material in the chamber is oxide coated.

7. Apparatus as set forth in claim 6 further defined by ionization means disposed within said chamber and energized to ionize oxygen molecules therein whereby the ionized molecules are attracted to the material disposed in the chamber for oxidation of the material.

8. Apparatus as set forth in claim 6 further defined by means continuously passing material through said chamber, and cooling means sealed from the atmosphere and receiving material from said chamber for rapidly reducing the temperature of oxide coated material prior to passage of same into the atmosphere.

9. Apparatus as set forth in claim 8 further defined by said cooling means comprising a vacuum chamber, and means for introducing an inert gas into said cooling chamber.

References Cited

UNITED STATES PATENTS

| | | | |
|---|---|---|---|
| 2,434,931 | 1/1948 | Johnson | 148—6.3 X |
| 2,899,556 | 8/1959 | Schopper et al. | |
| 3,123,493 | 3/1964 | Brick | 117—107.1 X |
| 3,183,563 | 5/1965 | Smith. | |

FOREIGN PATENTS 235,996  9/1964  Austria.

ALFRED L. LEAVITT, *Primary Examiner.*

RALPH S. KENDALL, *Examiner.*